US006377944B1

(12) United States Patent
Busey et al.

(10) Patent No.: US 6,377,944 B1
(45) Date of Patent: Apr. 23, 2002

(54) WEB RESPONSE UNIT INCLUDING COMPUTER NETWORK BASED COMMUNICATION

(75) Inventors: Andrew T. Busey; Peter Novosel, both of Austin; Govind Balakrishnan, Round Rock; Peter Bunyan, Austin, all of TX (US); Brett Morrison, San Francisco, CA (US); Dwight M Moore; Kirschen Alcyone Seah, both of Austin, TX (US); Rickey E. Chevrie, Dripping Springs, TX (US); George Currie; Yuan Sylvia Tien, both of Austin, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/210,169

(22) Filed: Dec. 11, 1998

(51) Int. Cl.[7] .............................................. G06F 17/30
(52) U.S. Cl. .............................. 707/3; 707/4; 707/104; 370/389; 379/265
(58) Field of Search ........................ 370/389; 379/265; 434/118; 707/3, 4, 104.1

(56) References Cited

U.S. PATENT DOCUMENTS 5,946,386 A * 8/1999 Rogers et al. ............... 379/265
5,991,394 A * 11/1999 Dezonno et al. ............ 379/265
6,069,891 A *  5/2000 Mandalia .................... 370/352
6,196,846 B1 *  3/2001 Berger et al. ............... 434/118
2001/0028649 A1 * 10/2001 Pogossiants et al. ........ 370/389

OTHER PUBLICATIONS

Keating, Tom, "Companies Should not Spend the Time to Build a Web Site and Still Maintain an e–mail System that is directed by a Webmaster", CTI for Management, v.3,n.4, Apr. 1998, p50–54.*
Bianchi, Alessandra, "Lines of Fire", INC. ,v20,n9,(INC. Technology Supplement) Jun. 16, 1998, pp.36–49.*
Anonymous, "Ceridian Employer Services Improves Customer Service With State of the Art CommunicatiOn System", Business Wire. Oct. 20, 1998, p. 1428.*

* cited by examiner

Primary Examiner—Paul R. Lintz
(74) Attorney, Agent, or Firm—Blakely, Sokoloff, Taylor & Zafman LLP

(57) ABSTRACT

A network-based customer interface allows a customer to receive automated information from a variety of data sources, or databases, including a knowledge base and frequently asked question database. The data sources are updated based on recording ongoing customer queries and transactions with the database. The updates can be reviewed before they are used to update the data sources. Customer authentication is performed so that the customer can be given an elevated level of service and so that any prior customer sessions can be used to help human agents know about the customer's situation.

65 Claims, 8 Drawing Sheets

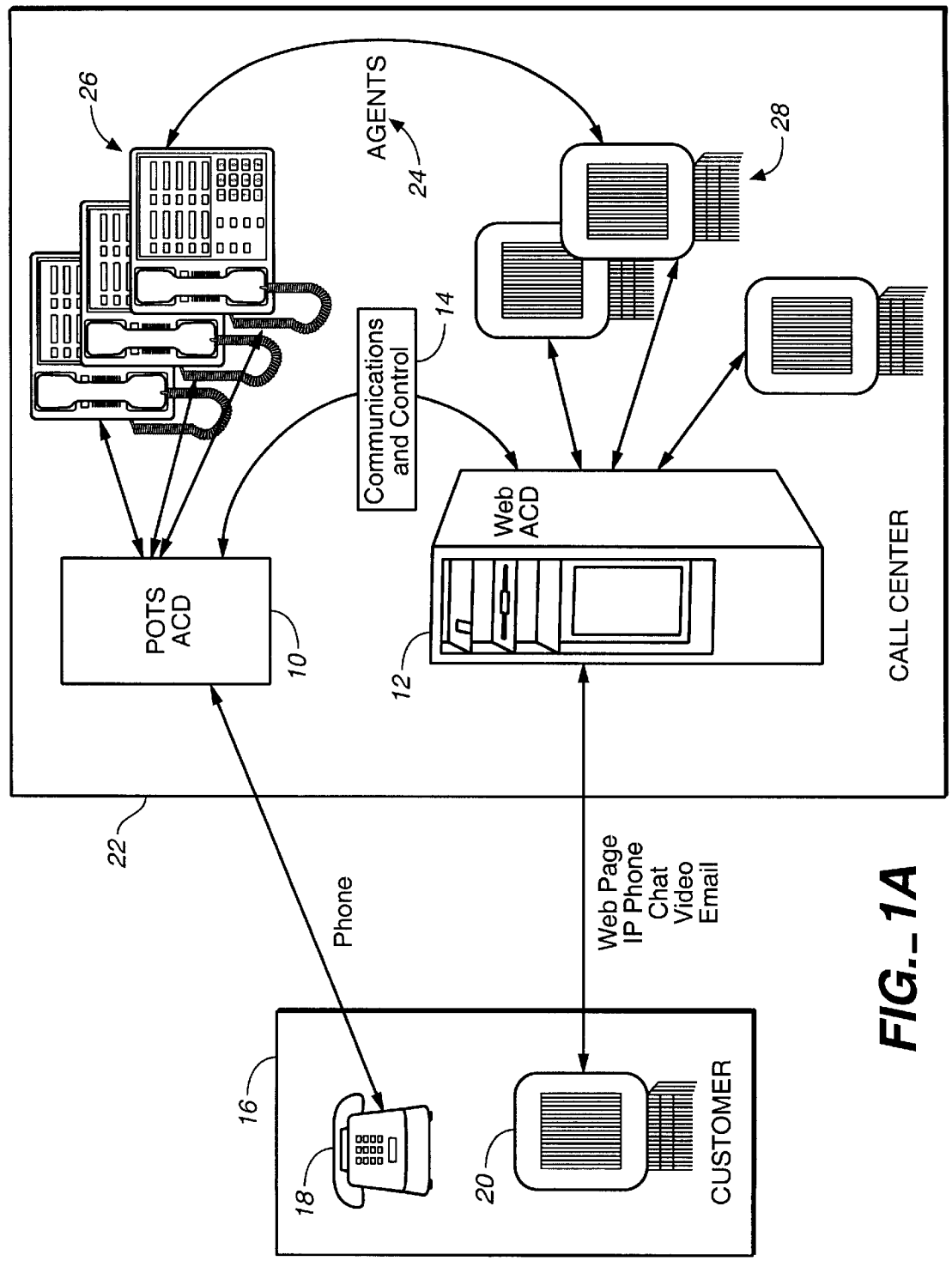
FIG._1A

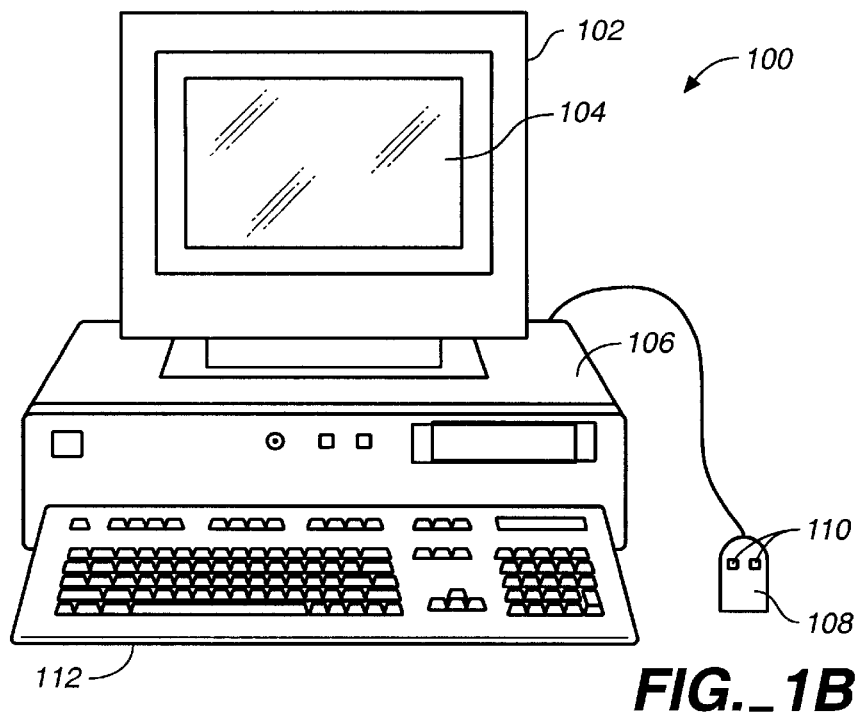
FIG._1B
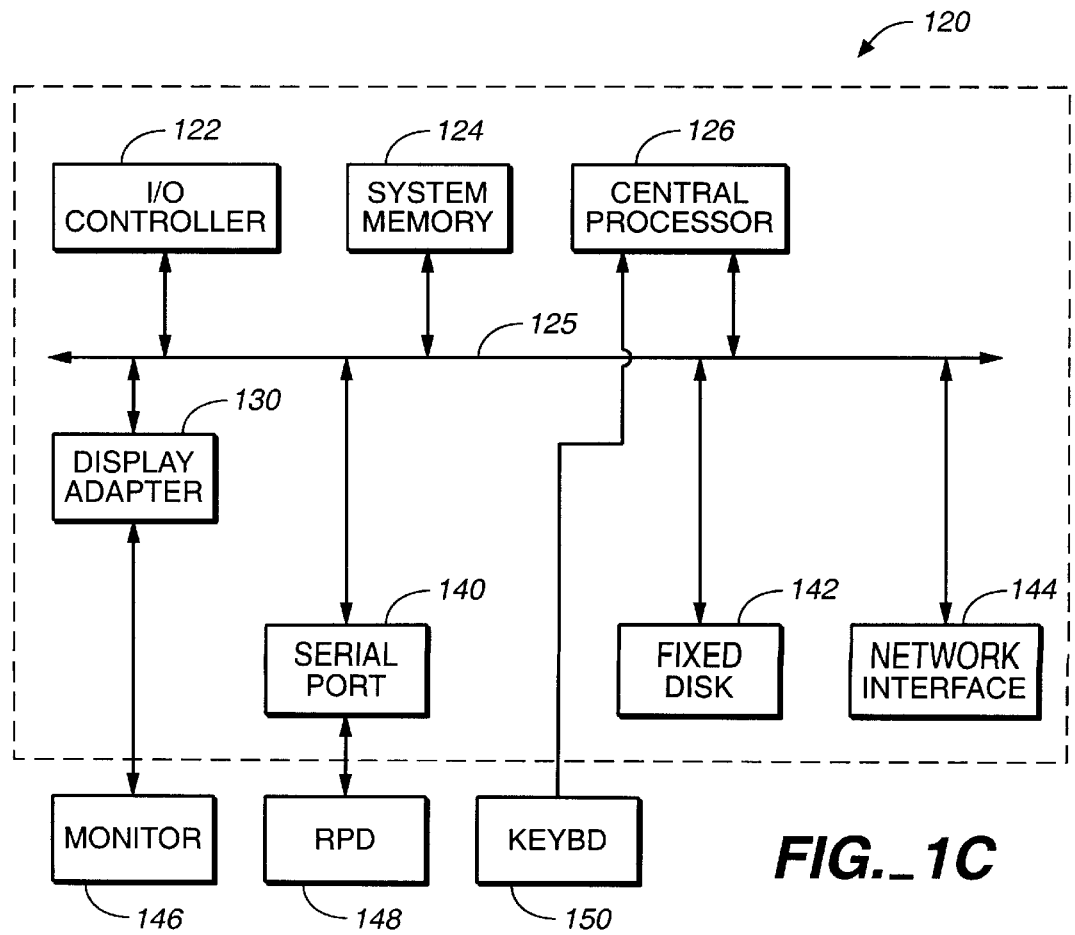
FIG._1C

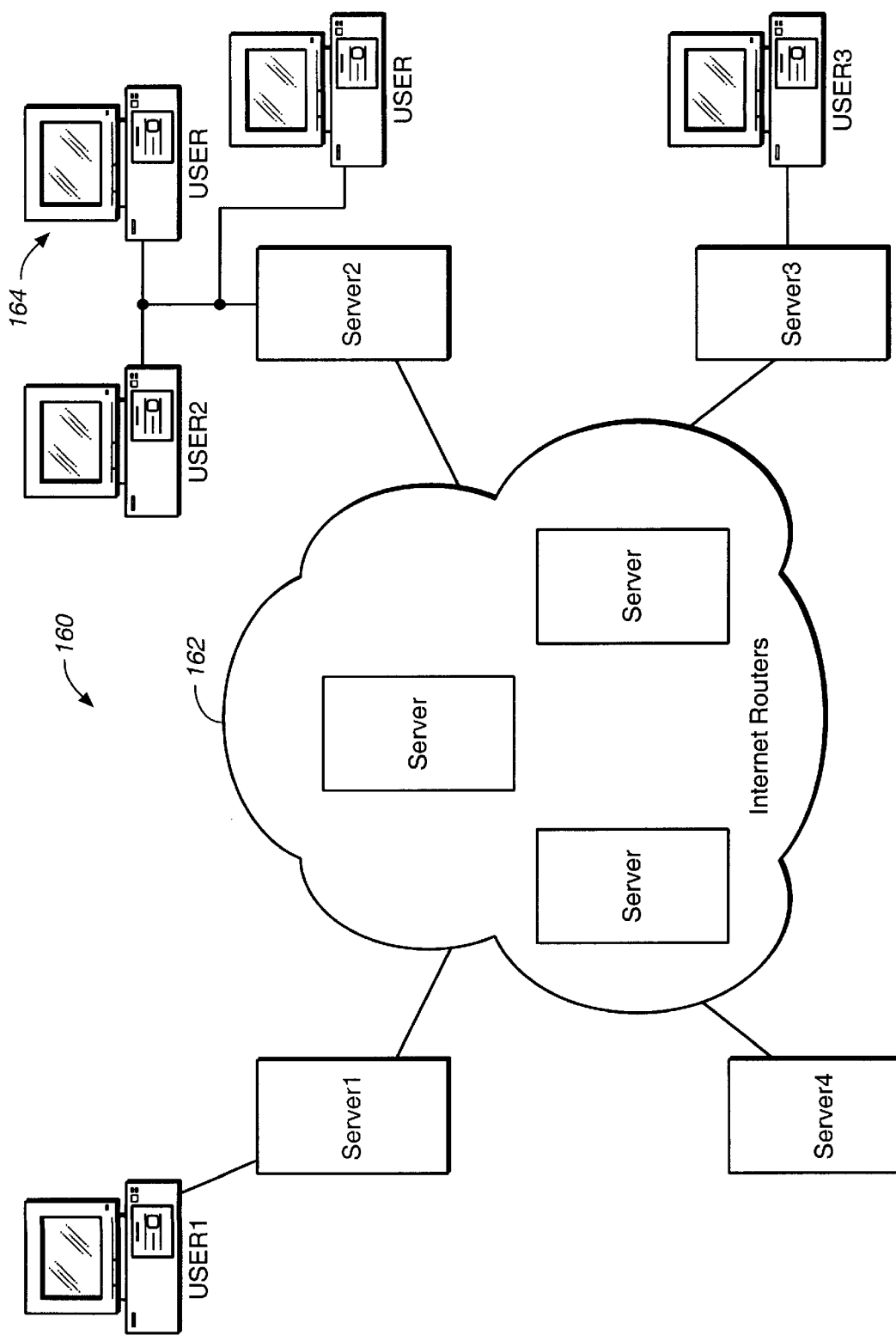
FIG._1D

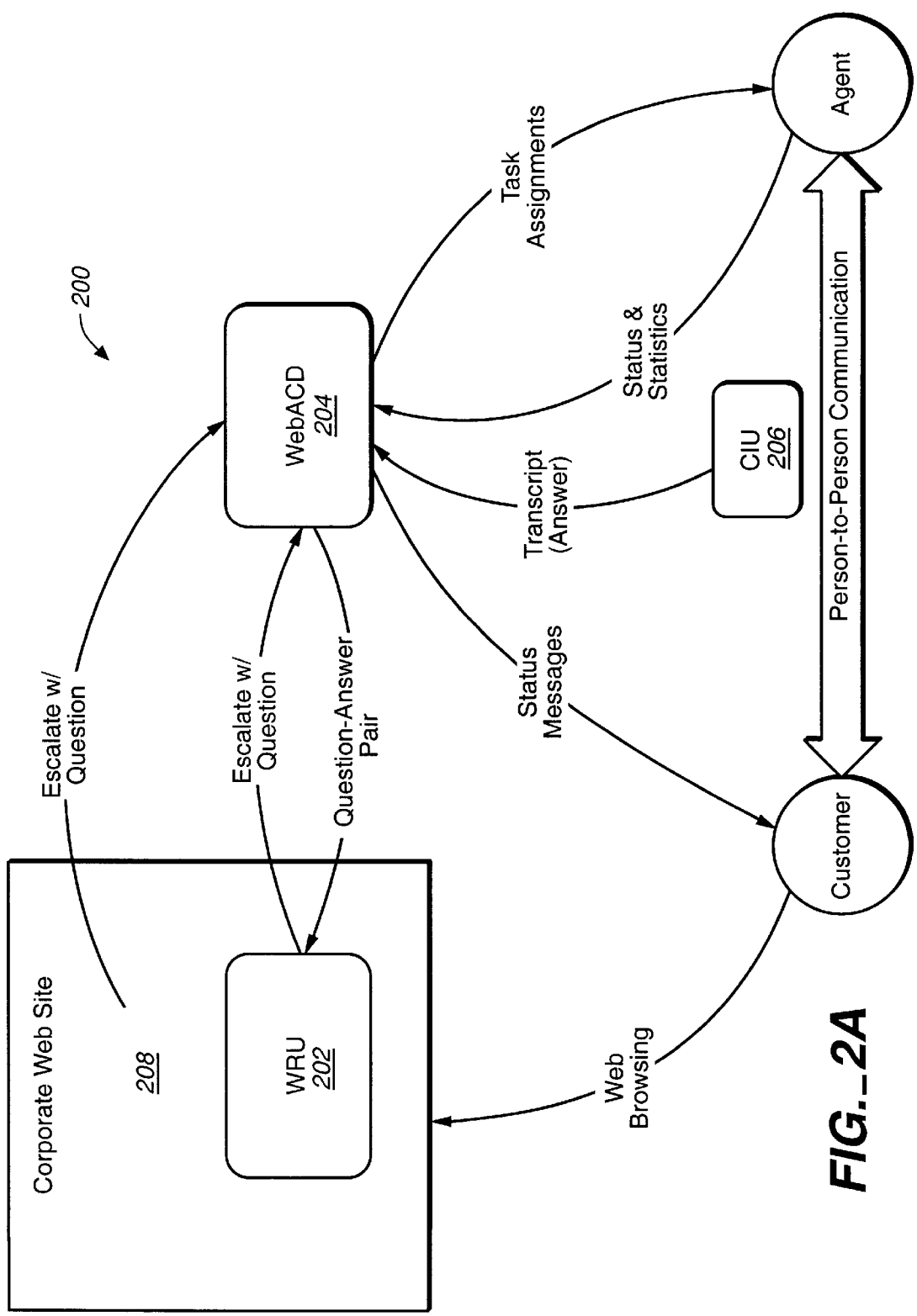
FIG._2A

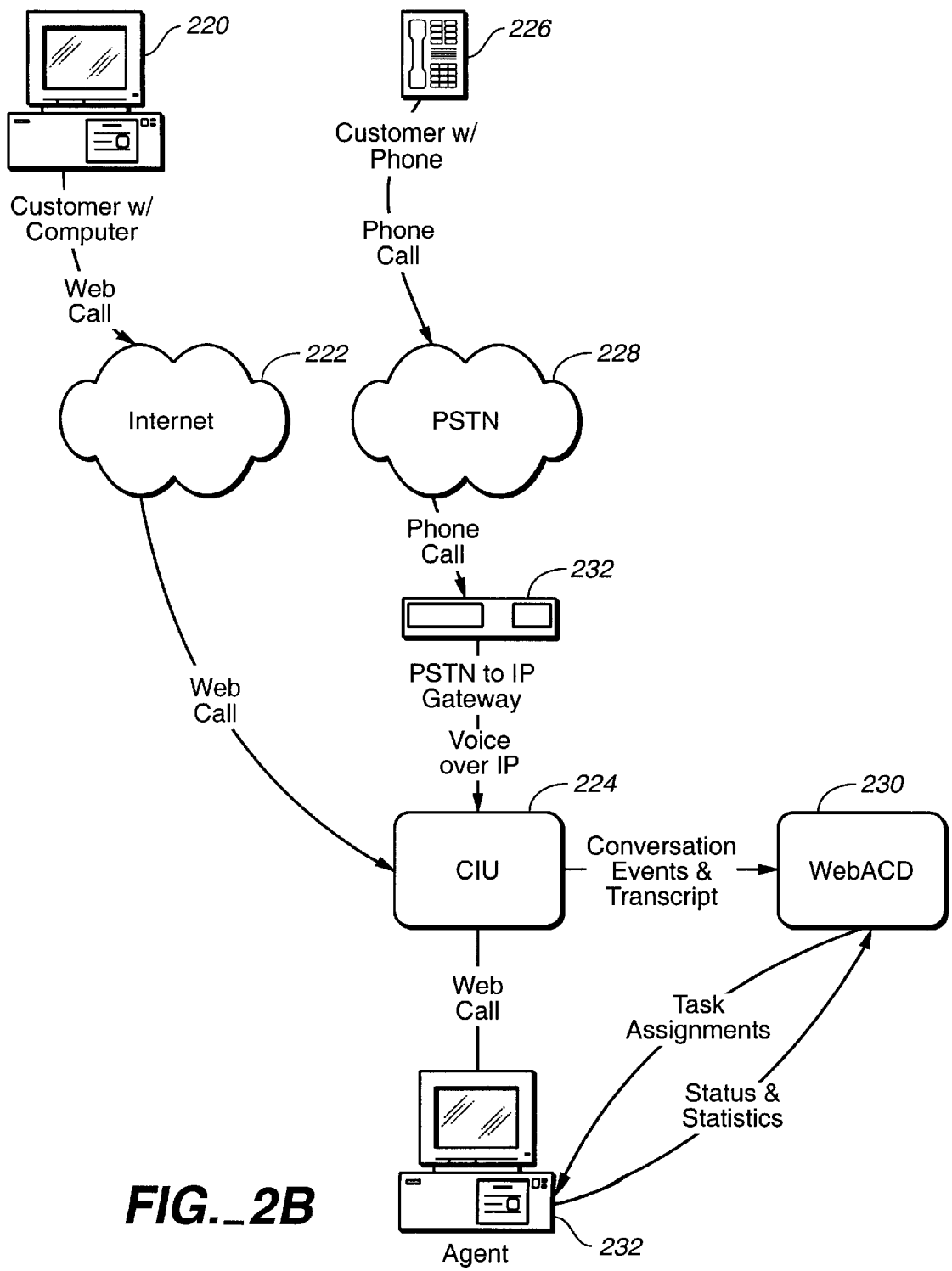
FIG._2B

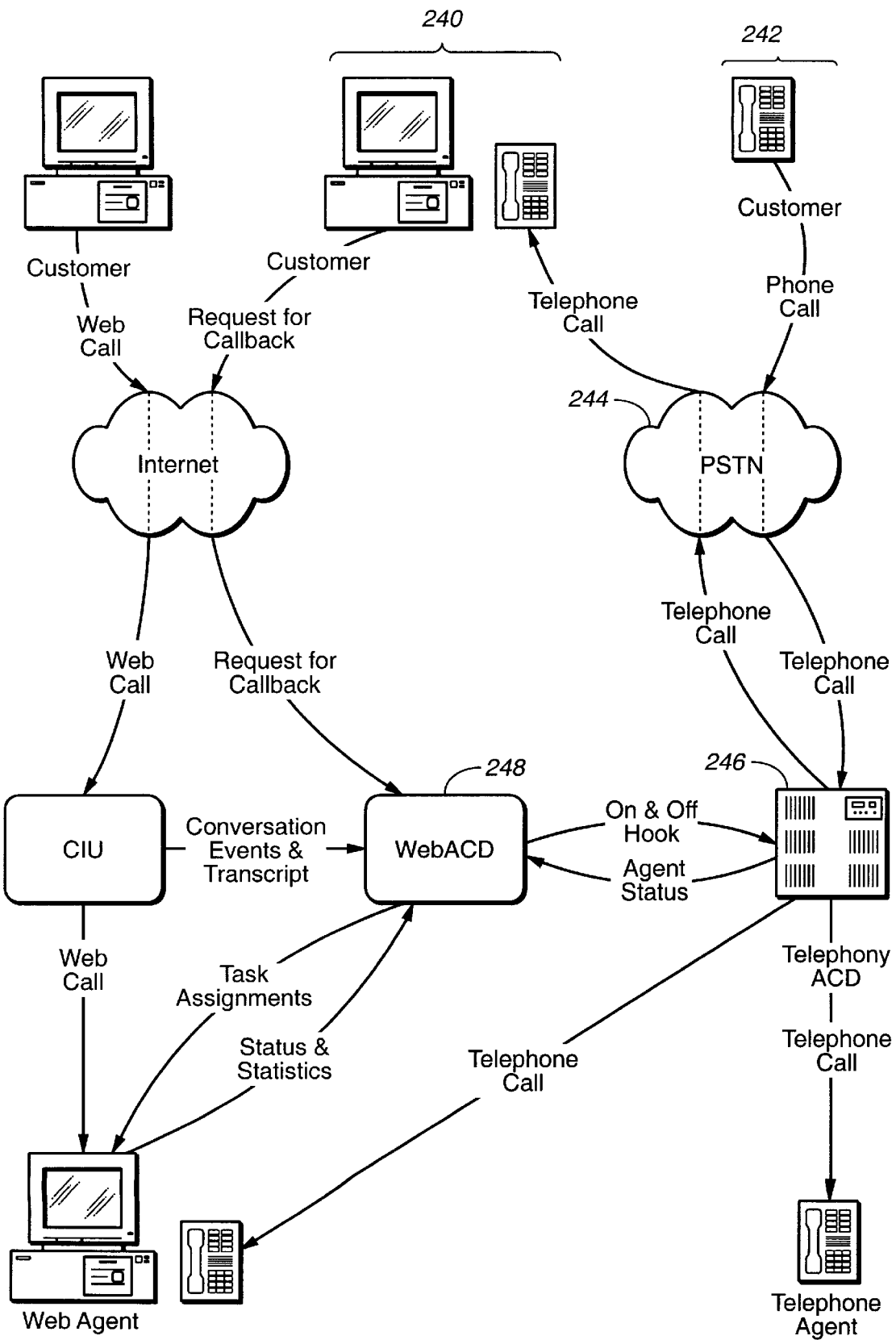
FIG._2C

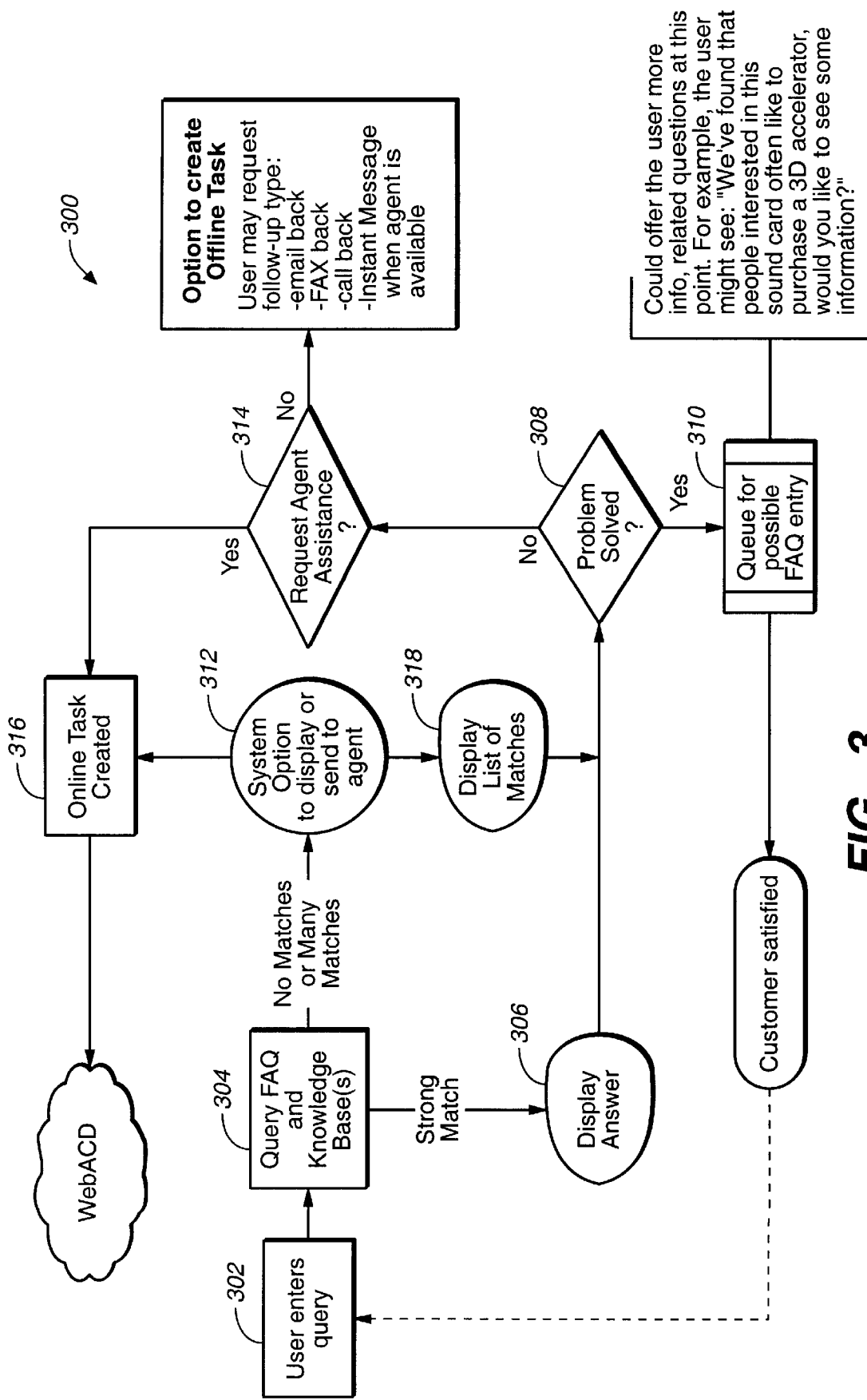
FIG._3

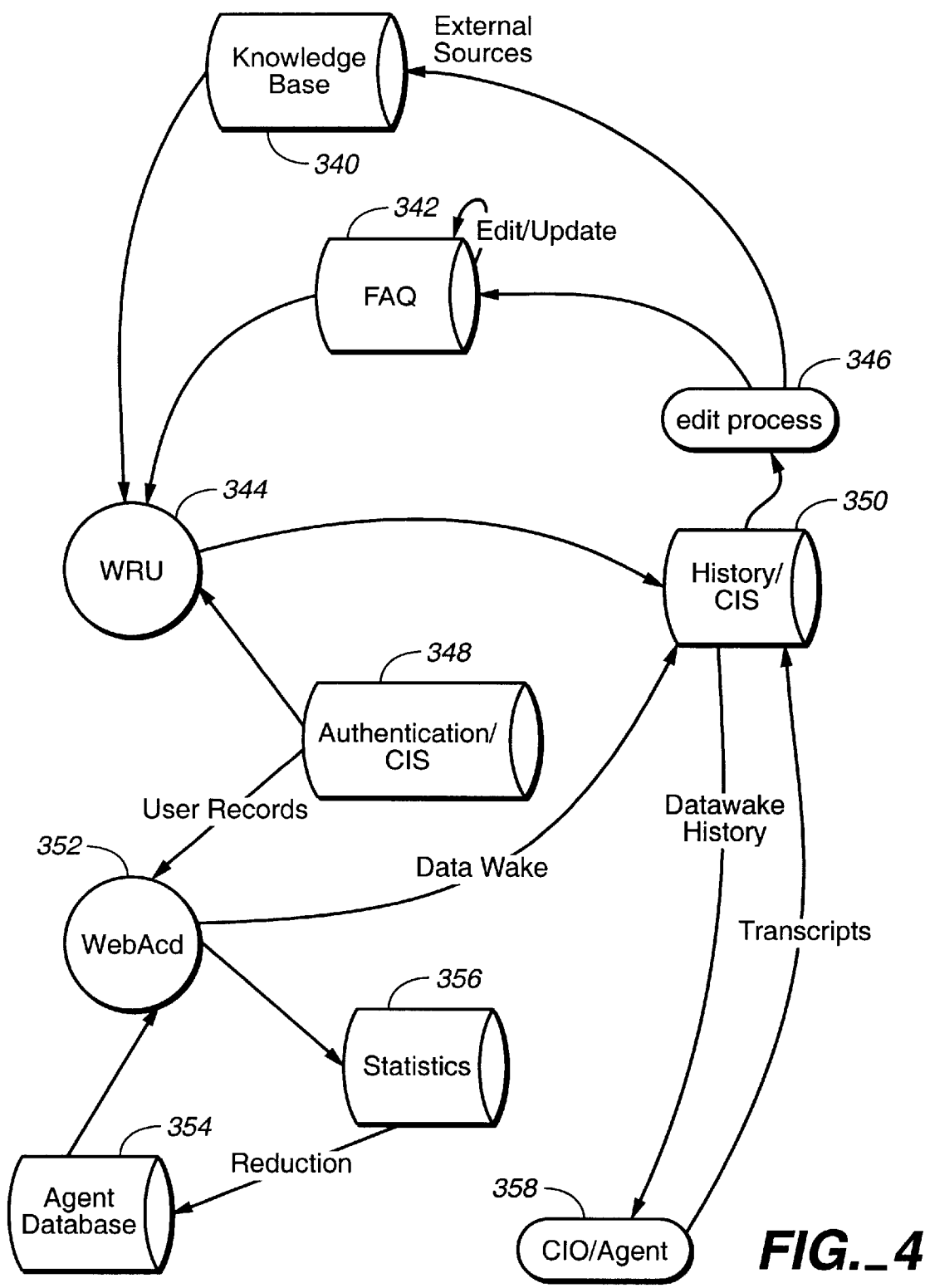
FIG._4

WEB RESPONSE UNIT INCLUDING COMPUTER NETWORK BASED COMMUNICATION

RELATED APPLICATIONS

This application is related to patent application Ser. No. 09/209,800 filed on Dec. 11, 1998 which is hereby incorporated by reference as if set forth in full in this document. The related application describes a system known as the Web Automatic Call Distributor (WebACD). This specification describes a Web Response Unit (WRU). Both the WebACD and the WRU are part of an overall system for handling automated call distribution where different communication types are used.

COPYRIGHT NOTICE

A portion of the disclosure recited in the specification contains material which is subject to copyright protection. Specifically, portions of source code, scripting language and program model and design information appear in the specification. The copyright owner has no objection to the facsimile reproduction of the specification as filed in the Patent and Trademark Office. Otherwise all copyright rights are reserved.

BACKGROUND OF THE INVENTION

Automatic call distribution centers, also called ACDs or "call centers," route telephone calls from customers who place the calls, to agents who respond to the calls. A typical application for a call center is in a customer support department where customers seek information to assist them in using a product.

Modern call centers provide many features to make the handling of calls and exchange of information more efficient. Not only do call centers strive to assist the customers in stating and categorizing their questions, and the agents in responding to the questions, but the call centers also provide supervisors who manage the agents with information so that the supervisors can make decisions on how to best operate the call center. Also, call centers provide information to assist product manufacturers, or service providers, in improving the quality of their customer service department, particular product or service, etc.

For example, a common feature of call centers today is to allow a customer/caller to select from a menu of choices to help categorize their needs. Often, this pre-selection by the customer allows the call center to screen and categorize customers so that customers can be matched up with the proper resources to handle the calls. Call centers also have mechanisms for "queuing" the calls according to the screening information, availability of agents, etc. Call centers can also maintain a database of previous calls from the same caller, or customer. This database can be available to an agent so that an agent will be familiar with the history of the callers' problems, needs, etc. Call centers also log data on calls and call handling. For example, the time each agent spends per call may be a statistic that is of interest to a supervisor in order to judge agents' performances. Also, analysis of the types of calls being received as where, for example, recurring problems appear, can be used to identify problems in a product or service.

The products and services available in today's information age have become more complex and implicate complex technology. The knowledge necessary to use, configure and upgrade products has grown, inevitably translating into a need for more customer support. Unfortunately, today's call centers do not always provide optimum exchange of information. The almost exclusive use of the telephone as the sole communication channel between a customer and agent does not always provide flexible and efficient exchange of information. The shortcomings of today's call centers are especially deficient in light of the increasing volume of calls that call centers must handle. It is not uncommon for call centers to have hundreds of agents handling thousands of calls each day. A call center's operating overhead can be in the millions of dollars per year. The impact of a good customer support center, however, can be reflected in revenues in the hundreds of millions, thus making an efficient and effective call center vital to a company's successful operation. However, today's call centers have failed to adapt to provide an efficient exchange of information between the call center and the customers in light of today's products and technology.

For example, it is common for computer users to download software applications, software updates, drivers, data, etc. from the Internet. In order to support these software products companies provide online documentation in the form of notes, instructions, lists of "Frequently Asked Questions" (FAQs) and other documentation. However, the Internet's presentation of information is often inadequate to all but the most sophisticated computer and Internet users. Even when looking at a single manufacturer's website, a customer may spend a long time only to determine that the answer to their question does not exist within the wealth of information provided at the website. Customers are left to their own devices to figure out how to search among web-based information and often can not make effective automated searches because they don't know how to characterize their problems in a few keywords.

As an alternative to online documents, some manufacturers allow more customized assistance by providing, for example, an e-mail form or address to which the customer may send a question. However, in some cases, the customer may desire immediate response to which an e-mail response is not sufficient. Also, it is often awkward to state a problem without interactive communication. This is especially true with computer-related products where a discussion of a problem is often a mix of acronyms, abbreviations, syntax symbols and other peculiar uses of the written word beyond mere conversational text. Also, questions about using a user interface are difficult to state with text alone since locations, controls, objects, button presses, etc. need to be discussed.

Another form in Internet communication that is sometimes used in the customer support arena is "real-time chat," or, simply, "chat." The chat form of communication allows typed text to appear immediately on another person's screen so that two or more people may have a typed "conversation" by using their computers over a network such as the Internet. In customer support, moderated chat is another communication type that can be used to give information to customers but it represents the same type of personnel drain to the customer service provider that voice communication presents and, thus, is not a popular form of customer service support unless some screening or prioritizing can be performed. Typically, this means a customer must submit a request for a chat with an agent. In these systems, the customer is at the disadvantage of not knowing when an agent will appear and may thus have to wait online whether they desire to be in front of their computer or not.

Of course, the customer can revert to the traditional communication method of picking up the telephone and dialing a customer support center. However, this reduces the customer to voice descriptions of their problem which, in the computer and software world, may not translate well. For example, anyone who has tried to relay a long uniform resource locator (URL) by calling out the slashes and sub-domain names of text that is a collection of garbled non-words at best, and then having to verify the name when it is repeated back by the person at the other end, can understand the value of being able to use text or other images in a conversation to describe a problem. Also, many of today's customers use their single telephone line to connect to the Internet. This means it is not possible for a customer to simultaneously converse about a problem with an Internet-related product and test out a suggested solution in real time.

Thus, it is desirable to provide a call center system that enhances the ability of a call center to exchange information with a customer. Such a call center should provide benefits in efficiency and effectiveness to both customers, agents, supervisors, and the manufacturer of a product, or provider of a service, to which the call center services are directed.

SUMMARY OF THE INVENTION

The present invention integrates multiple communication types in a call center and provides benefits when one or more communication types are used to provide a caller with information. The communication types can be chat, email, Internet Protocol (IP) voice, traditional telephone, web page, digital image, digital video and other types. Features of the invention include allowing a single agent to handle multiple customers on multiple channels, or "end-points." The system prioritizes and assigns calls to agents based on a number of criteria. One criterion is the number of end-points assigned to an agent and that agent's availability. Another criterion is the assigned priority of a customer call. Another criterion is the priority of service provided to a specific customer. Another criterion is the efficiency of a given agent. Another criterion is the agent's efficiency at handling a particular communication type call.

The agent has control over accepting calls in a multiple end-point environment via an agent graphical user interface. Features of the agent graphical user interface include allowing the agent to drag and drop canned responses, images, URLs, or other information into a window for immediate display on a customer's computer.

The system also provides for detailed agent performance tracking. One type of performance that is tracked is the agent's performance on different communication types. The system takes into consideration how many lines or end points an agent had assigned to them.

The system provides failure recovery by using a backup system. If the network server fails, then the customer is connected directly to an agent in a peer-to-peer arrangement. When a failed computer comes back on line, the statistics gathered are then used to synchronize the returned computer.

The system provides extensive call recording or "datawake" information gathering. The system provides flexibility in transferring large amounts of historic and current data from one agent to another, and from storage to an active agent.

The system integrates human agents' knowledge with an automated knowledge base. The system provides for an agent updating, or adding, to the knowledge base in real time. The system also provides for "blending" of different communication types. For example, HTML can be included with chat-text so that, for example, a URL can be provided that can be clicked on to take a customer to a specific website. Agents may be allocated to different communication types as, for example, where agents handling telephone calls are re-allocated to handle web requests where web requests communication type calls suddenly increase in frequency.

One embodiment of the invention is a method for providing information in response to a customer request for information, the system using a communication network coupled to a database and coupled to a customer input/output device to convey information to and from the customer, the method includes the following steps: receiving signals from the input/output device to indicate a customer query to the database; returning information in response to the query; reviewing at least a portion of the query and response; identifying a portion of the reviewed query and response; and updating a database with the identified portion.

BRIEF DESCRIPTION OF THE DRAWINGS

FIG. 1A shows an overview of the call center of the present invention;

FIG. 1B is an illustration of a computer system suitable for use with the present invention;

FIG. 1C illustrates subsystems that might typically be found in a computer such as the computer of FIG. 1B;

FIG. 1D is a generalized diagram of a typical network;

FIG. 2A shows the major components and basic information flow in the WebCenter of the present invention;

FIG. 2B illustrates details of the "voice over IP" communication type of call in the WebACD;

FIG. 2C illustrates a configuration of the WebCenter where standard telephone calls are handled by a telephony ACD;

FIG. 3 shows a flowchart illustrating the flow of "questions" through the Self Help System; and FIG. 4 illustrates the data flow in the call center of the present invention.

DESCRIPTION OF THE SPECIFIC EMBODIMENTS

FIG. 1A illustrates the overall concept of the present invention. In FIG. 1A, plain old telephone system automatic call distribution (POTS/ACD) system 10 provides a telephone interface. POTS/ACD system 10 is integrated with other forms of communication such as those provided by a computer network. Specifically, the network can be the Internet using the World Wide Web (WWW or simply "Web") protocol defined, in part, by hyper-text markup language (HTML) pages. Communication types can be, for example, web pages, so-called Internet Protocol (IP) voice communication (such as that defined by International Telecommunications Union (ITU) recommendation H.323 (02/98)), packet-based multimedia communications systems, chat, video and e-mail. Any number or combination of these communication types can be used in different configurations of the present invention. Specifically, one or more of the network communication types can be used in a call center of the present invention without the need for a telephone interface. The network interface is shown as WebACD 12. The communication types provided by POTS/ACD 10 and WebACD 12 are used and controlled by communications and control 14. As discussed below, communications and control 14, along with other processes, devices, etc., as described, serve to perform the features and functions of the present invention. Many of these processes and devices are not specifically shown in FIG. 1A, which only illustrates the broad concepts of the present invention.

Customer Site 16 includes telephone 18 for standard-type voice communication. Customer site 16 also includes a computer 20 for network types of communication. Each of these communication types is discussed in detail below. Other communication types are possible and can be suitable with embodiments of the invention. It will be apparent that present, and future communication types can be substituted, or added to, the communication types discussed herein with many of the same mechanisms and features that apply to the listed communication types also being applicable to communication types not specifically discussed.

FIG. 1A shows Call Center 22 including POTS/ACD 10, WebACD 12 and communications and control 14. The coordination of these systems allows human agents at 24 to respond to customer inquiries, requests, and other needs, via telephone communication represented at 26 and network-based communication types at 28 via the use of telephones and computers, respectively. Additionally, the system provides automated information where, by the use of a knowledge base or other data exchange, the customer is provided with information without requiring the participation of a human agent.

The details of the present invention will be described in connection with the Figures as follows: Section 1 describes hardware suitable for use with the present invention; Section 2 provides a system overview of the invention; Section 3 describes in detail those portions of the system that allow callers to obtain information without the aid of an agent; Section 4 describes in detail those portions of the system that allow callers to be assigned to, and interact with, agents; Section 5 details the data-logging capability of the present invention; Section 6 explains the scripting control language; and Section 7 describes agent performance monitoring.

1. Description of Hardware

FIG. 1B is an illustration of computer system 100 including display 102 having display screen 104. Cabinet 106 houses standard computer components (not shown) such as a disk drive, CDROM drive, display adapter, network card, random access memory (RAM), central processing unit (CPU), and other components, subsystems and devices. User input devices such as mouse 108 having buttons 110, and keyboard 112 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1C illustrates subsystems that might typically be found in a computer such as computer 100.

In FIG. 1C, subsystems within box 120 are directly interfaced to internal bus 128. Such subsystems typically are contained within the computer system such as within cabinet 106 of FIG. 1B. Subsystems include input/output (I/O) controller 122, System Memory (or "RAM") 124, CPU 126, Display Adapter 130, Serial Port 140, Fixed Disk 142, Network Interface Adapter 144. The use of bus 128 allows each of the subsystems to transfer data among subsystems and, most importantly, with the CPU. External devices can communicate with the CPU or other subsystems via bus 128 by interfacing with a subsystem on the bus. Thus, Monitor 146 connects with Display Adapter 130, a relative pointing device (e.g. a mouse) connects through Serial Port 140. Some devices such as Keyboard 150 can communicate with the CPU by direct means without using the main data bus as, for example, via an interrupt controller and associated registers.

As with the external physical configuration shown in FIG. 1B, many subsystem configurations are possible. FIG. 1C is illustrative of but one suitable configuration. Subsystems, components or devices other than those shown in FIG. 1C can be added. A suitable computer system can be achieved without using all of the subsystems shown in FIG. 1C. For example, a standalone computer need not be coupled to a network so Network Interface 244 would not be required. Other subsystems such as a CDROM drive, graphics accelerator, etc. can be included in the configuration without affecting the performance of the system of the present invention.

FIG. 1D is a generalized diagram of a typical network.

In FIG. 1D, network system 160 includes several local networks coupled to the Internet. Although specific network protocols, physical layers, topologies, and other network properties are presented herein, the present invention is suitable for use with any network.

In FIG. 1D, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 162. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line.

Similarly, other computers at 164 are shown utilizing a local network at a different location from USER1 computer. The computers at 164 are coupled to the Internet via Server2. USER3 and Server3 represent yet a third installation.

2. System Overview

The present invention is embodied in a product called WebCenter™, manufactured and distributed by Acuity, Corp. The WebCenter design includes three distinct subsystems referred to as the Web Response Unit (WRU), WebACD and Communications Interface Unit (CIU).

The WRU handles initial customer interaction with the system. The WRU allows a customer to obtain information independently, such as by querying a database, compilation of Frequently Asked Questions (FAQ) or other information source. The WRU manages the customer login process, provides for self-help searching of knowledge bases, tracking of customer issues and their resolution. The WRU provides interfaces for connection with other data systems' databases for knowledge searches. If the customer cannot find the appropriate information from the WRU then the customer can escalate to the WebACD and talk to a live agent.

Once a customer call has been escalated, the WebACD manages interaction between customers and agents, forwards unresolved issues to human agents and routes customer requests for agent interaction. The WebACD supports interfaces to traditional ACD systems allowing those call center agents to operate in both telephony and Web support roles. Links to these traditional ACD systems will allow the WebCenter to mark agents as "busy" when they are handling Web-based issues, and streamline the agent tracking process by using the ACD system agent ID numbers for identification and authentication.

The CIU manages the physical communications channels between customers and agents. In a preferred embodiment, the CIU module provides real-time text discussion, or chat, with multimedia extensions allowing agents and customers to interact immediately to solve a particular problem. The CIU also provides a number of interfaces to extension modules, including computer-telephony integration (allowing customers to request a telephone call-back) and H.323 (i.e., "voice packet," or "packet over IP") to PBX integration. The latter function allows agents to speak with a customer via their telephone handset, while the customer uses an internet phone (H.323 compliant software) on their end of the connection.

FIG. 2A shows the major components and basic information flow in the WebCenter of the present invention.

In FIG. 2A, WebCenter 200 includes the major components discussed above, namely WRU 202, WebACD 204 and CIU 206. Typically, a WebCenter is implemented on one or more computers, servers or other processing devices equipped with appropriate communications devices as discussed herein. For example, FIG. 2A shows WRU 202 as executing within a corporation's website. This can mean that the web page interface to the WRU is linked from another page on the corporate web site and that the same servers that handle the corporate web site also implement the WRU. However, it should be apparent that although the architecture of the WebCenter is presented throughout this specification in terms of specific computers, communication devices, processes, etc., that many arrangements are possible. For example, the web-based nature of the WRU interface to the customer means that the WRU's processes can be executing at one or more remote computers that don't have to be local to any other processes or processors in the WebCenter or corporate website. Also, the customer can access the WRU interfaces, and other interfaces of the WebCenter (i.e., "customer interfaces," discussed below) from any computer system that supports a web browser. Similarly, agent interation with the WebACD portion of the system is web-based so that the same features of remote accessibility and distributed processing apply.

FIG. 2A illustrates the basic flow of information between the WRU, WebACD and CIU components and between a Customer and Agent.

Events such as a customer call or other form of question origination can be from the WRU, specifically, or the corporate web site in general. For example, a customer may be browsing the corporate web site for information and can access information through the WRU. Some of the customer inquiries can be handled in an automated fashion through databases where the customer interacts with a process. At some point the WRU may determine that the customer's inquiry needs to be serviced by interaction with a human agent. At this point the inquiry is escalated to WebACD 204. Similarly, events can be escalated from other sources in the corporate website directly to the WebACD where agent assistance is needed as shown by the arrow from corporate web site 208 to WebACD 204. In general, events are escalated when the information exchange needs to be more interactive. Once an inquiry or event is escalated to the WebACD it is referred to as a "call."

Calls are queued within the WebACD and are assigned to agents based on numerous factors including the type of communication (e.g., chat, email, voice, web-page, IP voice), availabilty of agents, agent efficiency with respect to a communication type, and customer priority rating. When an agent successfully answers a question in certain types of communication, such as email, the answer is provided to the customer and may also be used to update a database so that the answer can be provided in an automated fashion the next time the same or similar question is asked.

FIG. 2A shows that the WebACD sends status messages to the customer. These messages inform the customer as to their position in a queue while waiting for their call to be assigned to an agent. Agents are informed of the existence of a pending call, are informed of details of the call and are alerted if a call has been pending for a long time. Agents are assigned tasks, or calls, by the WebACD. Statistics on agent performance are collected by the ACD for monitoring and performance review purposes. The statistics are used to generate reports for agent supervisors, and for other management purposes. In cases where an agent and customer communicate via a communication type that can be easily recorded, such as chat, the CIU can record the entire transcript (or a portion) of the dialogue and transfer the transcript to the WebACD for storing and future reference. Other communication types can be recorded, also, such as voice or IP voice. This can be accomplished by audio recording, by speech recognition, etc.

FIG. 2B illustrates details of the "voice over IP" communication type of call in the WebACD.

In FIG. 2B, a customer's speech is picked up by, e.g., a microphone coupled to a sound card in computer 220. The digitized speech is transferred over Internet 222 to CIU 224 which acts as the interface between the WebCenter and a customer with respect to voice calls. CIU 224 handles routing of voice calls to an agent such as at agent computer station 232, sends a record of conversation events and transcripts to WebACD230, and is controlled by WebACD 230 in accordance with queuing of customer calls and assignment of agents as discussed, above, in connection with FIG. 2A.

FIG. 2B also illustrates how a standard telephone call is handled in the WebCenter. A customer uses a standard telephone 226 to place a call through PSTN 228. This call is received at the WebCenter and is converted to "voice over IP" by gateway 232. The converted voice data is sent to CIU 224. Thus, due to the conversion, standard telephone transmissions can be handled identically with "voice over IP" transmissions. This provides the WebCenter with greater control of voice calls and allows the same software to be used to handle both types of voice calls. Also, this allows an agent to be able to remotely handle calls in an identical manner with agents located at the customer service site. All that is needed is that an agent have access to a computer with audio input/output capability. Note that in the configuration shown in FIG. 2B, the agent can respond to voice calls (whether originated through PSTN or "voice over IP") from a microphone and speaker built into agent computer system 232.

FIG. 2C illustrates a configuration of the WebCenter where standard telephone calls are handled by a Telephony ACD. This is useful in cases where a company already has expensive telephony ACD equipment installed. The configuration of FIG. 2C allows handling of new communication types to be added into existing traditional call centers.

In FIG. 2C, customers at 240 and 242 have telephones that connect to PSTN 244. Customer initiated calls through PSTN 244, unlike telephone calls in FIG. 2B, are not converted to "voice over IP" format. Instead, the calls remain in the standard telephone domain and are answered by a traditional telephony ACD 246 which routes the calls to an agent's telephone under control of ACD 246. The configuration of FIG. 2C also allows a customer to place a request for a "callback" from the customer's computer, for example, from the computer at 240. The WebACD performs the request for callback. When the call is assigned to an agent, WebACD instructs telephony ACD 246 to dial the customer at 240. When the customer answers the telephone the assigned agent is put in telephone communication with the customer.

Web Response Unit (WRU)

The Web Response Unit (WRU) allows a customer to receive information in the form of "self-help." That is, the customer is provided with automated databases or other query mechanisms that do not require the intervention, or assistance, of another human agent. However, the Web-Center of the present invention also provides for agent assistance, either by customer choice or by decision of one or more processes in the WRU. Agent assistance is then provided by the WebACD, described in other sections of this specification.

The WRU provides interfaces, in the form of web pages, to the Self Help Server (SHS). Although the WRU uses web pages as the interface in the preferred embodiment, other approaches are possible. For example, the WRU interface can be implemented as an application program, standalone application or by other means. Further, although specific screens are presented in this specification, it is up to the operator of the WebCenter to determine the specifics of the interface. That is, some operators may wish to use all of the interfaces provided herein. Others may implement a subset or distribute some of the functionality described here in different parts of a web site. Also, specific databases are discussed in connection with the WRU. It should be apparent that other databases may be used with equal effectiveness, depending on the types of querys that a customer may make to the WRU implementatioin on a particular web site.

FIG. 3 shows flowchart 300 illustrating the flow of "questions" through the SHS. A typical way to launch the SHS of the WRU is to provide a web button on a page for "help." The customer can enter the SHS directly by going to a site that is the first web page in the SHS, by clicking on a banner, hyperlink, or by other means. Once the customer accesses the SHS, a web page prompting for a question, type of question or other information appears. In some systems, the initial information requested is a login name and password. A name may be required in applications where it is desired to keep track of customers' records and to be able to retrieve past records associated with a customer. A password may be necessary where security is a concern, where the help service is restricted, etc.

Once launched, the SHS executes step 302 where the customer enters a query. This can be a general format query, as with a free-form plain-text language query. The query can also be of different forms such as a keyword query allowing logical operators. A preferred embodiment uses natural language-based query syntax. Where a free-form query is allowed, the SHS pre-processes the query into a suitable format for submission to one or more databases, search engines, or other information resource. For example, assuming the query is sent to a Frequently Asked Questions (FAQ) database and a Knowledge base, step 304 is executed after the query is processed into a proper form. Assuming there is an answer obtained for the query, step 306 is performed where the answer is displayed. Assuming, at step 308, it is determined that the answer satisfactorily resolves the customer's question the flowchart proceeds to step 310 where the question and answer pair are flagged for possible entry into the FAQ. That is, the question and answer pair can be used to update the FAQ (or other database) pending a database entry person's review of the appropriateness and accuracy of the pair. A preferred embodiment allows the customer to indicate whether their question was adequately addressed as a precondition to entering the question-answer pair into the FAQ or another database. At step 310, the SHS can also offer the customer additional information. For example, if it is known that user's who ask questions about certain products are usually also interested in another product, that other product can be mentioned to the customer.

After executing step 310 the customer's query has been satisfied and flow proceeds back to step 302 where the customer can enter another query and repeat the process. Alternatively, the customer can EXIT from the query loop at specific points to return to the original web site.

Assuming, at step 310, that the customer's problem is not solved to satisfaction, the customer is given the opportunity to request agent assistance at step 314. If the customer chooses to work interactively with an agent, then an online task is created at 316 and the task is used to create a session in the WebACD (discussed below). Else, if the customer chooses not to queue for agent assistance, the customer is provided with the opportunity to create an offline task. The offline task can take the form of a follow-up session to be initiated by an agent at a later time. Such a follow-up session can be by email, fax, telephone call-back, instant messaging (chat), voice-over-IP, voicemail or other communication type.

At step 304, assuming the customer does not obtain an appropriate answer to their query then step 312 is performed so that a human agent can be used to resolve the query. For example, an inappropriate response may be where a query returns either no match or a large number of possible matches. In the preferred embodiment, an agent supervisor or administrator can set the default handling mechanism—allowing a customer to browse a list of matches or to forward the existing, but insufficient, match to an agent for resolution. If, for example, a display of a list of matches is the default, the system executes step 318 to show the list. Else step 316 is performed to create an online task and to invoke the WebACD as discussed below. The customer can be allowed to reformulate the question before escalation to the WebACD, as desired. The customer can be provided with a check box, button or other web page control asking whether the answer is satisfactory.

One fundamental problem with knowledge bases and search engines today is the lack of "human intelligence." Many questions that could be easily answered by a live representative can be difficult or impossible to return as answers to a generic customer query. By providing a mechanism for agent interaction in the search process, the WRU adds tremendous value to existing databases and knowledge bases. When a user inputs a question and does not receive a high-confidence match from the knowledge base, the WebCenter can forward the question to a live representative, so that it can be matched with an appropriate response. A database of these questions and answers grows through system usage, resulting in reduced agent load and improved customer self-service and satisfaction. Additionally, the WRU provides links to external knowledge base systems in addition to the SHS. The match threshold can be set to any desired value, e.g., from 0 through 100%.

A preferred embodiment of the WRU allows for Microsoft COM interfaces to Netscape Enterprise Server 3.0 and Microsoft Internet Information Server 3.0 (or later). The web component of the WRU can accept HTTPS sessions allowing for security of transactions.

The WRU optionally performs login and authentication. By having customers identify themselves with a login name and a password, if required, past records of customer sessions can be retrieved, customer records can be updated, a past session can be resumed, etc. The customer identification can also be used to provide different levels of service at either the WRU or WebACD based on premium or preferred customers. The WRU supports authentication via a central database and can use other databases, if desired. Web Center installations not requiring login by customers can poll customers for information. As an example, such identification information can include a customer's name, company and email address.

The WRU uses multiple databases. Examples of databases that the WRU may incorporate for retrieving answers, or other information, for recordkeeping or other purposes include a Structured Query Language (SQL) database, History database, Frequently Asked Questions (FAQ) database, and Authentication Database. The SQL database is the primary search engine for customer queries and is part of the Knowledge Server, in the preferred embodiment. The SQL database includes searchable question/answer pairs and other information. The History database includes information on customers and their prior sessions. The History database stores "data wake" information about customer sessions either with the WRU or WebACD. This information can be as detailed as including a complete record of all email, chat or other types of communication sessions between a customer and the WRU or between a customer and one or more agents in the WebACD. The Authentication database is used to check customer signon names and passwords and to identify a customer as a preferred customer.

FIG. 4 illustrates the data flow in the call center of the present invention. In FIG. 4, the databases discussed above are shown as Knowledge Base 340, FAQ database 342, History/CIS 350 and Authentication/CIS 348. Additional databases are Agent database 354 and Statistics database 356 used in connection with the WebACD to store information on agents and to maintain a record of agent performance and other system statistics.

In FIG. 4, WRU 344 uses Authentication/CIS database 348 to identify a customer who signs in. If the customer is a preferred customer, this is noted and the customer may be given more beneficial treatment such as by immediately escalating the customer to the WebACD where they are put in communication with a human agent. Another way to provide preferred treatment is to give a preferred customer priority in search queues after the customer has entered a query for an answer. Knowledge base 340 and FAQ database 342 are also used by WRU 344 to provide information to the customer. Knowledge base 340 is used to answer customer queries after the customer makes a search request. The customer may also be directed to, or can directly invoke, the FAQ database where questions and answers are presented in a traditional document form.

Throughout the customer's interaction with the WRU, the customer's actions and the WRU's responses are stored in History/CIS database 350. This is the so-called "data wake" tracking that allows past records to be available to agents to help the agent come up to speed on the problem and to understand what information the customer has already been given. The History/CIS database is edited by a human, or is otherwise processed, as indicated at 346 to make sure that valid and useful information is entered back into the FAQ. The same is true of adding information to Knowledge Base 340. History/CIS database 350 is also edited by CIS/Agent 358. This represents another human review of the information in order to refine the information and make it more useful. For example, the CIS/Agent can add keywords and titles to the raw information exchange captured by the data wake. The CIS/Agent can format the raw information exchange into transcripts and store the transcripts back into History/CIS database 350.

By monitoring the History/CIS database, a CIS/Agent can also detect trends or major problems, such as when the incidence of a specific type of problem or query suddenly increases.

In a preferred embodiment the FAQ interface is HTML-based and allows the customer easy navigation between content sub-sections. Customers can be allowed to post a question to a public forum. Customers have the option to submit a natural language query, in addition to browsing the FAQ. The natural language query is processed by a search engine, and submitted to one or more databases. In the minimal configuration, a Knowledge Server submits the query to a locally-maintained FAQ database only. In more complex installations, an SQL database and a Scopus knowledge base can be queried, in addition to the FAQ database.

The Knowledge Server aggregates the responses from all database queries, organizing the returned information by percent-hit accuracy. The administrator of the WebCenter can set a percentage hit value that determines a threshold value for presentation to the customer (likely in the 90% range). For example, if a keyword search turns up 100 answers, each answer is rated as to how likely it appropriately answers the question or fits the search. If a question field associated with the answer exactly matches the customer's entered question then the hit value is set to a very high value. If only some keywords in the answer match a few or one keyword in the customer's question, then the hit value is very low for that answer. The maximum number of possible answers can be limited by the administrator.

In the preferred embodiment, a pushbutton control is provided on a web page that allows the customer to indicate if a specific message has solved their problem, or that they need additional assistance. The Knowledge Server logs all user responses whether positive or negative. When a user indicates that a particular knowledge base entry is the correct solution to their problem, the question and answer are logged to a customer resolved database. These question/answer pairs can be reviewed by an agent, who may create a FAQ database entry for the particular problem the customer was experiencing. The agent can also revise or edit the question/answer pair before making the pair a formal part of one of the databases.

Customers who indicate that they need additional assistance after a query by pressing a problem not resolved button are placed in an agent queue for assignment to an agent. The agent handling is discussed in detail in the related patent application referenced above, that describes the WebACD portion of the Web Center installation. When a customer receives an unsatisfactory answer, or no answer, a dialog box is provided where users can choose to 1) try another search, 2) modify their search, 3) request more information offline—via email, FAX or a telephone call-back, or 4) be queued for an online agent. Customers choosing options two or three create entries in the agent queue described in the related application.

A database of questions and responses is maintained by the Knowledge Server. The Knowledge Server database contains query/response matches logged during customer self-help or agent-assisted knowledge base searches. This "FAQ list" aggregates the most frequently asked customer questions and appropriate answers into a single, easily searchable database. The Knowledge Server FAQ database is searched first, and aggregates problem/solution data from all other databases available to the Knowledge Server.

Questions and agent responses that are created "on the fly" as answers to customer problems are optionally (i.e., if specified by the administrator) placed in a temporary queue. Entries submitted to this queue do not become Knowledge Base entries until approved by a supervisor or system administrator.

The SHS interoperates with the WRU to provide FAQ database maintenance functions. The SHS also functions independently, being able to maintain a customer database, authenticate customers and be maintained by an administrator separately from the WRU. The Knowledge Server can import data from external sources. An import utility allows common formats to be translated into Knowledge Server entries. This utility provides a basic ability to import text delimited files.

In a preferred embodiment, the Knowledge Server maintains the FAQ database including a question and answer pair format that allows for easy export/import of data and full-text searching of all data. Each entry includes tracking information such as the number of times the record has been accessed, when the record was created, and source databases used to obtain answer information. Solution data, or other informative data such as links to web pages that describe an installation or configuration process, images of the product, and text descriptions of solutions to particular problems, are provided.

Question/answer pairs can be linked to other, related, entries. For example, a question regarding a general printer malfunction, which contains a description of common "cannot print" causes and remedies, may also have links to other more specific printer malfunction entries. Displaying the answer entry for the general "cannot print" question may present the customer with links to specific entries such as "cannot print after software upgrade" or "cannot print after toner replacement."

FAQ entries can support "translation templates." This allows the creation of FAQs whose answer varies based on information obtained about the requesting customer. For example, a commonly asked question on a banking customer service site may be "what is my account balance?" The answer to this question will vary, based on the account information of the requesting customer. The knowledge base should support creation of FAQ entries that contain customized responses, using a template structure to create mappings to customer-specific data. In this example, an agent may create a reply that looks like "Your balance is $customer_balance." The variable $customer_balance is mappable by the Knowledge Server to a particular table and field of a specified external data source. Numeric values, text, images, audio or other types of information can be mapped to the customer variables, as desired.

The customer has the option to browse through the FAQ database maintained by the Knowledge Server. Customers have a hierarchical view of questions and answers, viewable by general topic area. Administrators have the option of browsing the knowledge base entries, creating or modifying (or even deleting) any of the question/answer sets.

Topics can be marked as "moderated," where agents or customers can post messages that are not displayed to regular customers until a moderator verifies the submission. This moderation function may be used for FAQ submission screening. For example, a level one agent might solve a customer's problem and create a FAQ on the subject. This is placed in a moderated Kowledge Server topic where an agent reviews the entry and verifies the contents before other customers or agents access the submitted information.

Although the invention has been described with reference to particular embodiments thereof, these embodiments are merely illustrative of preferred embodiments of the invention. The scope of the invention is to be determined solely by the appended claims.

What is claimed is:

1. A method for providing information in response to a customer request for information, the system using a communication network coupled to a database and coupled to a customer input/output device to convey information to and from the customer, the method comprising steps of receiving signals from the input/output device to indicate a customer query to the database;

retrieving information which is responsive to the query;

forming a response to the query with the retrieved information; and transmitting at least a portion of the query and response to said input/output device;

reviewing at least a portion of the query and response.

2. The method of claim 1, the method comprising additional steps of identifying and editing a portion of the reviewed query and response; and updating a database with the identified portion.

3. The method of claim 2, wherein the communication network uses web-page communication.

4. The method of claim 2, wherein the communication network uses email communication.

5. The method of claim 2, wherein the communication network uses chat communication.

6. The method of claim 2, wherein the communication network uses voice-over-Internet-Protocol communication.

7. The method of claim 2, wherein the step of reviewing includes the substep of manual review.

8. The method of claim 2, wherein the step of reviewing includes the substep of automatic review.

9. The method of claim 2, wherein the the step of retrieving includes the matching of the query to stored queries.

10. The method of claim 2, wherein the step of transmitting includes the automatic interpretation of links to networked data.

11. The method of claim 10, wherein the updating includes storing links to networked data.

12. The method of claim 11, wherein the linked data includes arbitrary information files.

13. The method of claim 11, wherein the linked data includes web pages.

14. The method of claim 11, wherein the linked data includes streaming media.

15. The method of claim 11, wherein the linked data includes records in other databases.

16. The method of claim 2, wherein the updating includes placing one or more expiration dates on the updated record or records.

17. The method of claim 16, wherein the reviewing step includes the substep of filtering out records which have expired.

18. The method of claim 2, wherein the reviewing step includes the substep of filtering out records which have expired.

19. The method of claim 1, wherein the communication network uses web-page communication.

20. The method of claim 1, wherein the communication network uses email communication.

21. The method of claim 1, wherein the communication network uses chat communication.

22. The method of claim 1, wherein the communication network uses voice-over-Internet-Protocol communication.

23. The method of claim 1, wherein the step of reviewing includes the substep of manual review.

24. The method of claim 1, wherein the step of reviewing includes the substep of automatic review.

25. The method of claim 1, wherein the the step of retrieving includes the matching of the query to stored queries.

26. The method of claim 1, wherein the step of transmitting includes the automatic interpretation of links to networked data.

27. The method of claim 1, wherein the reviewing step includes the substep of filtering out records which have expired.

28. The method of claim 27, wherein the reviewing step includes the substep of reporting expired records to administrative personnel.

29. The method of claim 27, wherein the reviewing step includes the substep of deleting records which have expired.

30. The method of claim 1, wherein the reviewing step includes the substep of using stored customer data.

31. The method of claim 1, wherein the method is invoked by the customer pressing a button on a web page.

32. The method of claim 1, wherein the method is invoked by the customer pressing a banner on a web page.

33. The method of claim 1, with the additional step of recording information in response to a customer request for information, including a portion of the query and response (the accumulation of such data is hereinafter referred to as the data wake).

34. The method of claim 33, with the additional step of analyzing the accumulated data wake to determine if if the customer requires human assistance, then placing the customer in communication with a human agent.

35. The method of claim 34, wherein the analyzing step utilizes a finite-state automaton.

36. The method of claim 34, wherein the analyzing step makes use of both preset customer data and the accumulated data wake.

37. A method of providing information in response to a customer request for information, the system using a communication network coupled to a database and coupled to a customer input/output device to convey information to and from the customer, the method comprising steps of
   requiring the customer to enter identification information;
   using the identification information to determine the customer's level of service;
   if the customer's level of service is equal to a predetermined threshold then placing the customer in communication with a human agent, else placing the customer in communication with an automated database.

38. A method for recording a customer's actions, the system using a communication network coupled to a database and coupled to a customer input/output device to convey information to and from the customer, the method comprising steps of
   receiving signals from the input/output device to indicate a customer request;
   accumulating information about the context and the nature of the customer's request in a data wake;
   if a predefined condition is met with respect to the accumulated information, then permitting the requested action to proceed; and
   storing in the data wake a response to the requested action.

39. The method of claim 38, wherein said receiving and accumulating use the specific mechanism of a web server plugin.

40. The method of claim 38, wherein said receiving and accumulating use the specific mechanism of a browser applet.

41. The method of claim 38, wherein said receiving and accumulating use the specific mechanism of a server applet.

42. The method of claim 38, wherein said receiving and accumulating use of the specific mechanism of a customer browser banner.

43. The method of claim 38, wherein said receiving and accumulating use the specific mechanism of a scripted customer browser frame.

44. The method of claim 38, with the additional step of
   analyzing the data wake to determine if the customer may require human or automated assistance;
   displaying an offer of assistance on said customer input/output device; and
   if the offer is accepted, then placing the customer in communication with a human agent or with an automated database, else withdrawing the offer.

45. The method of claim 44, with the additional step that a declined offer is repeated after a preset period of time.

46. A method for providing information in response to a customer request for information, the system using a communication network coupled to a first database and a second database and coupled to a customer input/output device to convey information to and from the customer, the method comprising steps of
   storing information in the first database in association with a first customer;
   receiving signals from the input/output device to indicate a query from the first customer to the second database;
   retrieving an information template from the second database in response to the query, wherein the template includes text information and spaces for information to be inserted;
   obtaining at least a portion of the stored information from the first database;
   combining the obtained information with the information template; and
   transmitting the combination of the obtained information and the information template to the first customer.

47. The method of claim 46, further comprising the steps of
   obtaining a number from the database; and
   combining the number with the information template.

48. The method of claim 47, wherein the number represents the first customer's account balance.

49. The method of claim 46, further comprising the steps of
obtaining a text string from the database; and
combining the text string with the information template.

50. The method of claim 46, further comprising the steps of
obtaining image information from the database; and
combining the image information with the information template.

51. The method of claim 46, further comprising the steps of
obtaining audio information from the database; and
combining the audio information with the information template.

52. An information exchange system comprising
a communication link between a customer and a call center;
a database at the call center coupled to the communication link for providing responses to customer queries, the database including multiple answers for a given query, the database including a referral mechanism for providing human agent assistance to generate a response to the query under predetermined conditions and invoking agent assistance to select which of the multiple answers shall be provided to the customer; and
a database update mechanism for storing an agent-assisted response so that subsequent similar customer queries will result in the stored agent-assisted response being provided.

53. An information exchange system comprising
a communication link between a customer and a call center;
a database at the call center coupled to the communication link for providing responses to customer queries, the database including multiple answers for a given query, the database including a referral mechanism for providing human agent assistance to generate a response to the query under predetermined conditions and invoking agent assistance to set a ranking order for the multiple answers to be used when the multiple responses are displayed to a customer; and
a database update mechanism for storing an agent-assisted response so that subsequent similar customer queries will result in the stored agent-assisted response being provided.

54. An information exchange system comprising:
a communication link between a customer and a call center;
a database at the call center coupled to the communication link for providing responses to customer queries, the database including multiple answers for a given query, the database including a referral mechanism for providing human agent assistance to generate a response to the query under predetermined conditions and invoking agent assistance to select which of the multiple answers shall be provided to the customer;
a database update mechanism for storing an agent-assisted response so that subsequent similar customer queries will result in the stored agent-assisted response being provided; and
storage means for saving the selected answer for future presentation to subsequent customers with the same question.

55. An information exchange system comprising:
a communication link between a customer and a call center;
a database at the call center coupled to the communication link for providing responses to customer queries, the database including multiple answers for a given query, the database including a referral mechanism for providing human agent assistance to generate a response to the query under predetermined conditions and invoking agent assistance to select which of the multiple answers shall be provided to the customer;
a database update mechanism for storing an agent-assisted response so that subsequent similar customer queries will result in the stored agent-assisted response being provided;
an approval mechanism for allowing a customer to approve an agent's selected answer; and
storage means for saving the selected and approved answer for future presentation to subsequent customers with the same question.

56. A method of providing information to customers in response to customers' requests via a communication network coupled to a database, comprising:
receiving via the network a first customer query to the database;
automatically without human intervention retrieving from the database information which is responsive to the received first query;
automatically without human intervention forming a response to the received customer query from the retrieved information;
transmitting the formed response to a first customer via the network;
a human editing at least a portion of the received customer query and the formed response;
receiving via the network a second customer query to the database; and
in response to the received second query, transmitting the edited query and response to a second customer via the network.

57. The method of claim 56 wherein the step of editing comprises:
receiving from the first customer via the network an evaluation of the transmitted formed response; and
in response to the evaluation being a positive evaluation, editing at least said portion of the received query and the formed response.

58. The method of claim 57 further comprising:
in response to the evaluation being a negative evaluation, connecting the first customer to a human agent.

59. The method of claim 57 further comprising:
in response to the evaluation being a negative evaluation, presenting the first customer with a choice of (a) submitting an alternative query, (b) receiving more information off-line, and (c) being connected to a human agent.

60. The method of claim 56 wherein the step of editing comprises:
storing the edited received query and formed response in a frequently-asked-questions database; and
the step of transmitting the edited query comprises the step of in response to the received second query, retrieving the edited query and response from the frequently-asked-questions database for transmission to the second customer as a response to the received second query.

61. The method of claim 56 wherein the step of editing comprises:

storing the edited received query and formed response in a frequently-asked-questions database to make the edited received query and formed response accessible via the network to a plurality of customers.

62. An information exchange system comprising:

a communication link between customers and a call center;

a database at the call center coupled to the communication link for automatically without human intervention transmitting formed responses to customer queries from a first customer and a second customer; and a database mechanism to allow for a human editing at least a portion of the customer queries and the responses.

63. The information system of claim 62 further comprising:

a referral mechanism for connecting the customer to a human agent in response to a negative evaluation sent by the customer about the formed response sent to the customer.

64. The information system of claim 63 wherein the referral mechanism allows the customer a choice of (a) submitting an alternative query, (b) receiving more information off-line, and (c) being connected to a human agent.

65. The information system of claim 62 further comprising:

a storage means for storing the formed responses to make the formed responses available to the customers.

* * * * *